UNITED STATES PATENT OFFICE.

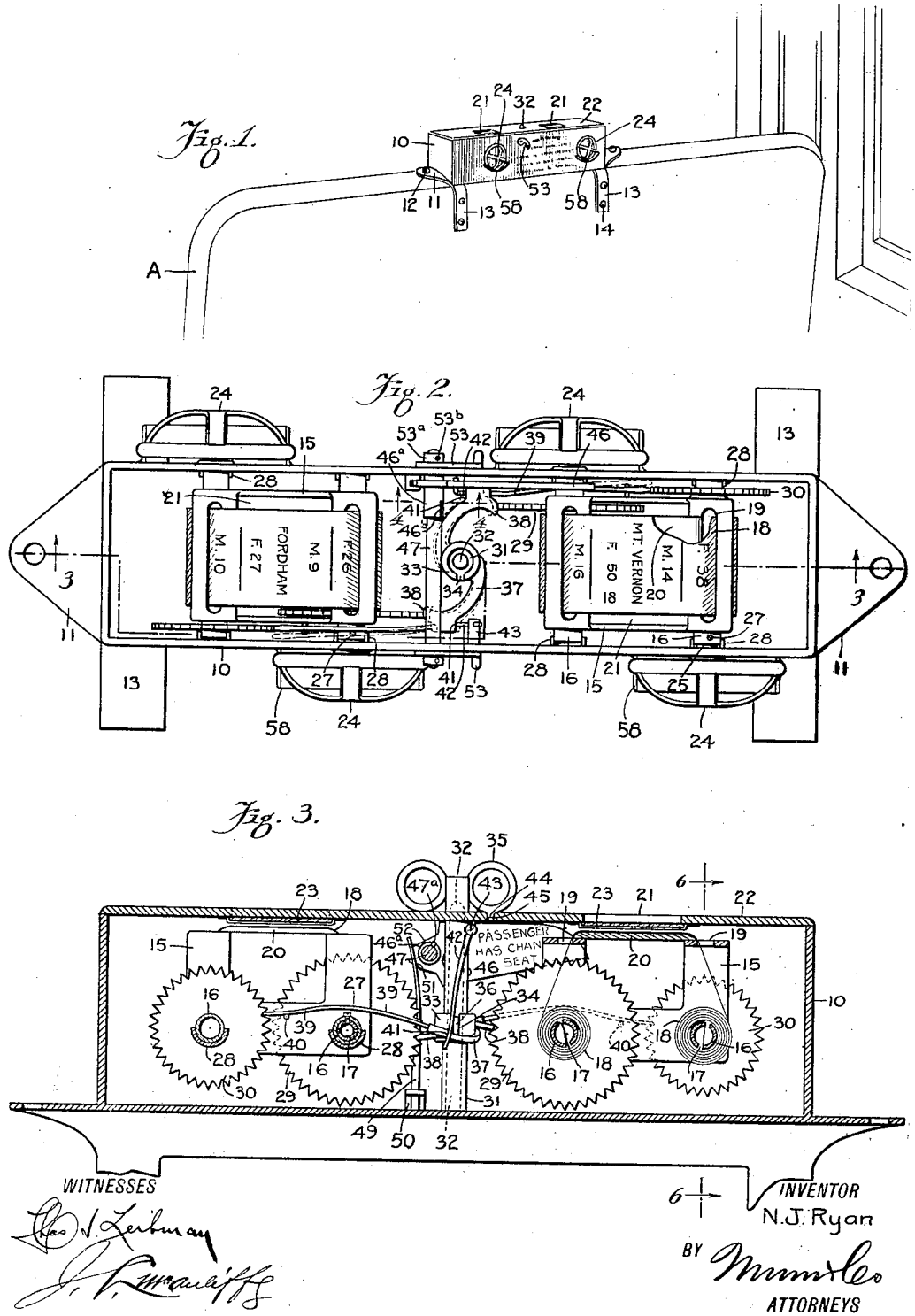

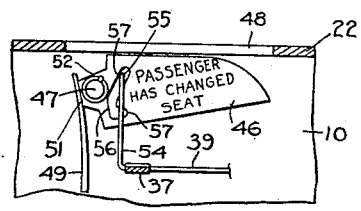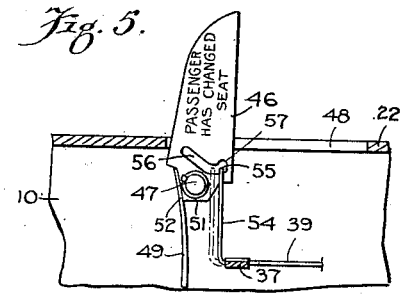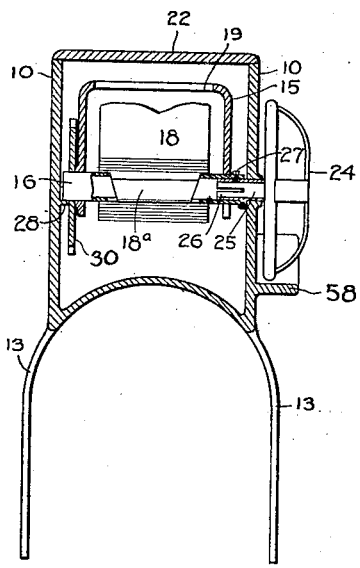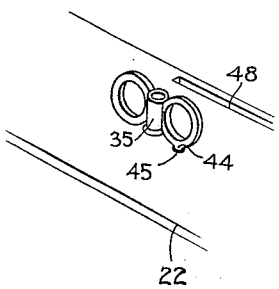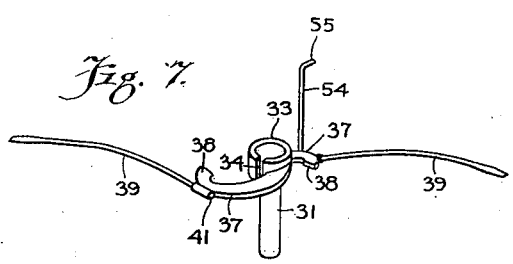

NICHOLAS J. RYAN, OF TUCKAHOE, NEW YORK.

INDICATOR MEANS FOR CAR-SEATS.

1,371,816. Specification of Letters Patent. Patented Mar. 15, 1921.

Application filed May 5, 1920. Serial No. 379,088.

*To all whom it may concern:*

Be it known that I, NICHOLAS J. RYAN, a citizen of the United States, and a resident of Tuckahoe, in the county of Westchester and State of New York, have invented a new and Improved Indicator Means for Car-Seats, of which the following is a description.

It is well known that railroads, particularly those having a heavy suburban traffic, suffer substantial losses by the dishonesty of passengers who purchase tickets entitling them to travel only comparatively short distances and then ride to destinations materially beyond the stations for which the tickets have been purchased. It is recognized also that the effort of the conductor to circumvent the dishonest practices referred to, entails a very trying task requiring continued alertness and occupies a great part of the conductor's time, the practice resulting frequently in unpleasant controversies with passengers.

My invention has for its general object to eliminate from the operation of passenger trains the objectionable features referred to by providing an indicating means adapted to be secured to the back of a car seat or otherwise suitably supported in position to be identified with the particular seat to which it pertains, the mechanism being arranged to be controlled by the conductor and to be set by him upon payment of a fare, in a manner that he may upon again approaching the seat, inform himself at a glance respecting the destination to which an occupant of a seat may be entitled to be carried.

The invention furthermore has for an important object to provide indicating mechanism for the purpose referred to and controlling means therefor, of such a character as to be unfailing in their operation by the conductor, and at the same time making provision for contingencies incident to railway travel as for example the changing of seats by a passenger after payment of a fare.

I have in view moreover, to provide an embodiment of the invention reflecting practical considerations respecting the facility with which the parts may be produced, assembled and adjusted, as well as to attain simplicity and durability of construction.

The nature of the invention and its advantages will be more clearly understood from the specific description following.

Reference is to be had to the accompanying drawings forming a part of this specification, it being understood that the drawings are merely illustrative of one example of the invention.

Figure 1 is a perspective view of indicating means embodying my invention, showing the same mounted at the top of a seat back;

Fig. 2 is an enlarged plan view of the indicator mechanism, the cover plate being omitted to show the interior mechanism;

Fig. 3 is a longitudinal vertical section taken in planes corresponding with the irregular line 3—3, Fig. 2;

Fig. 4 is a detail in longitudinal vertical section, the view being given to show a signal that may be displayed by a passenger upon changing a seat and automatically locked in the display position until restored by the conductor, the signal being illustrated in the lowered position within the casing;

Fig. 5 is a similar view to Fig. 4, showing the signal locked in display position;

Fig. 6 is a transverse vertical section on the line 6—6, Fig. 3;

Fig. 7 is a perspective view of the key-controlled dogs for engaging ratchet wheels on the tape reels to hold the latter against turning;

Fig. 8 is a fragmentary perspective view given to show a means for temporarily locking the conductor's controlling key to hold the dogs out of engagement with the ratchet wheels of the reels.

In carrying out my invention in accordance with the illustrated example, a suitable casing 10 is provided for housing the mechanism and a suitable means may be provided for rigidly securing said casing in position on the back of a car seat or otherwise to identify the indicating means with that particular seat. In the illustrated example the casing is made with end lugs 11 to rest on the top of the seat to be secured by screws 12 or other suitable fastening means. Additional means is provided in the way of side members 13 positioned to lie at the front and back of the seat and be secured by screws 14 or other fasteners.

The indicating means includes tapes bearing the names of the stations and other information such as miles and the fare and two sets of indicating means are provided, the usual transverse seats of passenger trains accommodating two passengers. Both sets of mechanisms are alike and each includes a suitable frame 15 presenting bearings for reels 16 which may be in the form of tubular shafts, said shafts having longitudinal slots 17 or equivalent means to secure the ends of tapes 18 here shown as having end bindings 18ª, (Fig. 6). A pair of reels 16 is provided for each tape and the tape runs from one reel through slots 19 in the top of frame 15 near the ends and over a table 20 disposed beneath a sight opening 21 in the cover 22 of casing 10, there being glass 23 at said openings.

The reels are turnable by means operable from the exterior of the casing 10 at the sides, such for example as hand wheels 24, the hubs or short shafts 25 of which extend through lateral openings in the sides of the casing, each being adapted to enter an end of a tubular reel 16. One handwheel is provided for each reel and they are arranged alternately at opposite sides of the casing so that one reel of a pair will have its handwheel or equivalent handle at one side of the casing, the handwheel of the other reel of the pair being at the opposite side of the casing, the arrangement making for compactness. Suitable means is provided to fasten the hub or shaft to the reel 16, there being indicated set screws 27. The ends of a reel 16 rest on curved bracket bearings 28 rigid with the casing at the interior.

The reels 16 of a pair are provided respectively with ratchet wheels 29, 30 and key-controlled dogs are provided for the same as follows: A tubular standard 31 is turnable as a sleeve on a post 32 rising from the bottom of the casing 10 and rigid therewith, the upper end of said post extending through the cover 22 or in any event it is accessible through the cover. At the upper end 33 the standard 31 is of an enlarged diameter to receive the tubular shank of a key 35 and is formed with a slot 34 to receive the bit 36 of the key for turning said standard by the key. On said standard are oppositely projecting arms 37, terminating in dogs 38 adapted to engage the respective ratchet wheels 29 of the two pairs of reels and extending from said arms 37 are elongated dogs 39 adapted to engage the other ratchet wheels 30. The frame 15 is provided with stop pins 40 beneath the dogs 39 to back up the latter. The arms 37 are formed to present shoulders 41 to receive the pressure of a bar spring 42 secured to any fixed part of the casing as for example to a pin 43 near the top of the casing, the arrangement being such that said spring 42 exerts its pressure on the shoulder 41 in a manner tending to turn the standard 31 and dogs 28, 29 in engagement with the ratchets.

With the above described construction, upon a conductor collecting a fare of a passenger, he may insert the key 35 through the top of the casing 22, the key being guided by the post 32, and the bit 36 of the key will be engaged in the standard 31 at the slot 34 thereof; thus the turning of the key will turn the standard 31 and disengage the dogs 38, 39 from the respective ratchet wheels 29, 30. The conductor may now turn the reels 16 through the medium of handwheels 24 to unwind either tape 18 from one reel and onto the other of the pair until the station to which the fare has been paid appears at the opening 21, whereupon the key is withdrawn to permit the spring 42 to restore the dogs into engagement with the ratchets.

In order that the conductor may not be put to the necessity of holding the key 35 in position with the dogs disengaged and subject to the tension of the spring 42, I provide for locking the key with the dogs in the release position, the illustrated means for the purpose consisting of a pendent stud 44 on the thumbpiece of the key at the bottom, said stud being adapted to enter a hole 45 in the cover 22 as the key is turned to a position with the dogs disengaged.

It will be obvious that with a station displayed at an opening 21, and the mechanism locked, the conductor upon again approaching the seat can ascertain at a glance whether the station to which the fare has been paid has been passed. He will therefore be in a position to demand an additional fare when circumstances justify it.

Looking to the contingency of a passenger after payment of a fare, changing from a seat in which the fare was paid to another seat, I provide a signal 46 that the passenger may display, the same presenting a surface to bear an appropriate legend, such as "Passenger has changed seat." Said signal is secured to a turnable transverse shaft 47 to swing in a vertical plane for displaying the signal above the cover 22, a clearance opening 48 being provided in said cover for the purpose. A spring 49 is provided, here shown as a bar spring fixedly secured at its lower end to a bracket 50 or equivalent means and adapted to bear against the signal 46 adjacent to the pivot thereof to hold the same either in position housed below the cover 22 or in display position, the signal being formed with two surfaces 51, 52 at such angles to each other as to receive the pressure of the spring, the spring bearing against the one surface 51 when the signal is housed, and against the other surface 52 when the signal is displayed. The signal is swingable to a display position by a passenger, the ends of shaft 47 being provided with handles 53 at the exterior of casing 10. The handles may be secured in any suitable manner; they are shown in the illustrated example with hubs 53ª receiving set screws 53ᵇ. The signal 46 is shown as formed with an elongated hub 46ª having a slot 46ᵇ adapted to receive a pin 47ª on shaft 47.

While the passenger may display the signal 46, the arrangement is such that only the conductor can swing the signal from the display position. To provide for locking the signal in display position, an upstanding spring 54 is provided which rises from an arm 37, said spring terminating in a lateral upper end 55 which extends into a slot 56 formed in the signal 46, there being a notch 57 complementary to said slot. With the swinging of the signal upwardly to the display position by turning the shaft 47, through the medium of one of the handles 53, the notch 57 will be brought above the end 55 of spring 54 so that any attempt to press the signal downwardly from the display position, will be resisted by said end 55 entering notch 57. The conductor, however, may lower the signal since when the tubular standard 31 is turned by the key 35 and the arms 37 swung through an arc to disengage the dogs 38, 39 from ratchet wheels 29, 30, the spring 54 will be moved to the dotted line position of Fig. 5, out of line with the notch 57 so that the conductor may manually lower the signal, the bent end 55 of spring 54 being afforded clearance by the slot 56. When the signal 46 reaches the display position, the spring 49 will snap from the surface 51 to the surface 52 for holding the signal raised. When the signal is lowered the said spring 49 will spring from the surface 52 to the surface 51, holding the signal in the lowered position.

As the key 35 is turned by the conductor to disengage the pawls 38, 39, from the ratchet wheels 29, 30, the locking projection 44 will spring into the recess 45 and hold the pawls disengaged until the key is again positively turned by the conductor to restore the parts.

To prevent clothing or other objects catching between the handwheel 24 and the casing 10 curved guards 58 are provided on the sides of the casing beneath said handwheel.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. An indicating means for passenger cars including a tape bearing station names, winding means for said tape, means optionally operable to actuate said winding means, and key-actuated means independent of the winding means for holding or releasing the winding means; together with locking means for said key-actuated means to hold the same in position with the winding means released.

2. An indicating means for passenger cars to indicate the particular station to which a fare has been paid, said means including a casing, a tape mounted in said casing, the latter presenting a sight opening through which the tape may be viewed, winding means for the tape and optionally operable from the exterior of the casing to permit the tape being controlled by a conductor, means to hold the winding means against turning, and means independent of the winding means and operable from the exterior of the casing to engage or disengage said holding means; together with locking means to hold the exteriorly operable means in position with the holding means disengaged.

3. An indicating means for passenger cars to indicate the particular station to which a fare has been paid, said means including a casing, a tape mounted in said casing, the latter presenting a sight opening through which the tape may be viewed, a pair of winding reels for said tape adapted to be turned from the exterior of the casing, ratchet wheels on said reels, dogs for said ratchet wheels, and means independent of said winding reels to control said dogs from the exterior of the casing to hold or release the ratchet wheels; together with locking means to hold said exteriorly operable means in position with the ratchet wheels released.

4. An indicating means for passenger cars to indicate the particular station to which a fare has been paid, said means including a casing, a tape mounted in said casing, the latter presenting a sight opening through which the tape may be viewed, a pair of winding reels for said tape adapted to be turned from the exterior of the casing, ratchet wheels on said reels, a turnable element mounted in said casing independent of said reels, and dogs carried by said element and adapted to engage or disengage the ratchet wheels with the turning of said element; together with means to lock said turnable element with said dogs disengaged from said ratchet wheels.

5. An indicating means for passenger cars to indicate a particular station to which a fare has been paid, said means including a tape, a revoluble means provided with ratchet wheels and adapted to wind said tape, a plurality of dogs for said ratchet wheels, and means independent of said revoluble means and mounting said dogs and adapted to be turned to engage or disengage said wheels; together with locking means for said last mentioned means to hold the same with said dogs disengaged from said ratchet wheels.

6. An indicating means of the class described, including a casing, a plurality of tapes, a pair of winding drums for each tape, each drum having a ratchet wheel, a dog for each ratchet wheel, and means independent of said winding drums to simultaneously engage or disengage the several dogs; together with locking means for said last mentioned means to hold the same with said dogs disengaged from said ratchet wheels.

7. An indicating means of the class described, including a tape, winding means for said tape, holding means to prevent the winding means from turning, and a key to actuate said holding means independent of the winding means for holding or releasing the winding means; together with means to automatically lock the key when said holding means is in the release position.

8. An indicating means of the class described including a tape, winding reels for said tape, ratchet wheels on said reels, dogs adapted to engage or disengage the ratchet wheels, a turnable element mounted independent of said reels and mounting said dogs, a spring tending to turn said element to a position with the dogs in engagement, and a key for turning said element; together with means to lock said key when the dogs are in release position.

9. An indicating means of the class described, including a casing, optionally operable means in the casing to indicate a station for which a fare has been paid, controlling means therefor operable from the exterior of the casing, so that a conductor may actuate the same; a visual signal swingably mounted and optionally operable to be moved to a display position, and key-controlled means to restore said signal.

10. An indicating means of the class described, including a casing, optionally operable means in the casing to indicate a station for which a fare has been paid, actuating means therefor operable from the exterior of the casing so that a conductor may actuate the same, controlling means for said first-mentioned means to hold or release the same, key-operated means to control said holding means, a signal optionally movable to display position, means to automatically lock the signal when moved to display position, and means to restore said signal, said last-mentioned means being releasable by the controlling means for the holding means.

11. An indicating means of the class described, including a casing, a tape in said casing, winding reels for the tape, ratchet wheels on said reels, holding dogs for the ratchet wheels, a turnable element carrying said dogs, a key engageable from the exterior of the casing to turn said element, a signal optionally movable to display position, and means to automatically lock the signal when moved to display position, said last-mentioned means being adapted to be released by said key when turning said element for restoring the signal from signaling position.

12. An indicating means of the class described including a casing, an indicating tape in said casing, winding means for said tape, means to control said winding means from the exterior of the casing, a signal optionally movable from the exterior of the casing to move the signal to display position, and means to automatically lock the signal when moved to display position, said locking means being adapted to be released by said controlling means to restore the signal from display position.

13. An indicating means of the class described including a casing, an indicating tape in said casing, winding means for said tape, means to control said winding means from the exterior of the casing, a signal optionally movable from the exterior of the casing to move the signal to display position, said signal having a slot and a notch complementary to the slot, an element extending into said slot, said notch in the throwing of the signal to display position being adapted to assume a position adjacent to said element for preventing movement of the signal from display position, said element being movable by said controlling means to a position away from said notch.

NICHOLAS J. RYAN.